US011163281B2

(12) United States Patent
Majumder et al.

(10) Patent No.: US 11,163,281 B2
(45) Date of Patent: Nov. 2, 2021

(54) RESILIENCY DETERMINATION IN A MICROGRID

(71) Applicant: ABB Power Grids Switzerland AG, Baden (CH)

(72) Inventors: Ritwik Majumder, Västerås (SE); Robert Saers, Västerås (SE); Giovanni Velotto, Västerås (SE); Ebrahim Shayesteh, Kista (SE)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 17/276,277

(22) PCT Filed: Sep. 10, 2019

(86) PCT No.: PCT/EP2019/074111
§ 371 (c)(1),
(2) Date: Mar. 15, 2021

(87) PCT Pub. No.: WO2020/058040
PCT Pub. Date: Mar. 26, 2020

(65) Prior Publication Data
US 2021/0247732 A1    Aug. 12, 2021

(30) Foreign Application Priority Data
Sep. 19, 2018   (EP) ..................... 18195383

(51) Int. Cl.
*G05B 19/042*   (2006.01)
*H02J 3/32*   (2006.01)
(Continued)

(52) U.S. Cl.
CPC ............ *G05B 19/042* (2013.01); *H02J 3/001* (2020.01); *H02J 3/32* (2013.01); *H02J 3/381* (2013.01);
(Continued)

(58) Field of Classification Search
CPC .......... G05B 19/042; G05B 2219/2639; H02J 3/381; H02J 13/0004; H02J 13/00006;
(Continued)

(56) References Cited

U.S. PATENT DOCUMENTS

2009/0254572 A1 * 10/2009 Redlich .................. G06Q 10/06
2010/0250497 A1 * 9/2010 Redlich ............... H04L 63/0227
707/661
(Continued)

FOREIGN PATENT DOCUMENTS

WO    2017067585 A1    4/2017

OTHER PUBLICATIONS

Chanda, Sayonsom, et al., "Quantifying Resiliency of Smart Power Distribution Systems with Distributed Energy Resources", 2015 IEEE 24th International Symposium on Industrial Electronics (ISIE), Buzios, Brazil, Jun. 3-5, 2015, 6 pages.
(Continued)

*Primary Examiner* — Ziaul Karim
(74) *Attorney, Agent, or Firm* — Slater Matsil, LLP

(57) ABSTRACT

A method can be used for determining resiliency in a microgrid that includes a number of assets. The method includes obtaining status data about devices used to control the assets as well as about communication resources of this control, determining, based on the status data, the health and availability of each asset to assist each of a plurality of functions for handling disruptive events in the microgrid, determining a resiliency index of the microgrid in performing the plurality of functions, providing the resiliency index to a control system of the microgrid, comparing, in the control system, the resiliency index with a least one threshold, and changing the control of the microgrid if any of the thresholds is crossed.

20 Claims, 6 Drawing Sheets

(51) Int. Cl.
  *H02J 3/38* (2006.01)
  *H02J 3/00* (2006.01)
  *H02J 13/00* (2006.01)

(52) U.S. Cl.
  CPC .... *H02J 13/0004* (2020.01); *H02J 13/00006* (2020.01); *G05B 2219/2639* (2013.01); *H02J 2203/20* (2020.01); *H02J 2300/10* (2020.01); *H02J 2300/24* (2020.01); *H02J 2310/10* (2020.01)

(58) Field of Classification Search
  CPC .......... H02J 3/32; H02J 3/001; H02J 2310/10; H02J 2203/20; H02J 2300/10; H02J 2300/24
  See application file for complete search history.

(56) References Cited

U.S. PATENT DOCUMENTS

| | | | |
|---|---|---|---|
| 2014/0106987 A1* | 4/2014 | Abrignani | G01N 33/564 506/9 |
| 2016/0241040 A1* | 8/2016 | Kusunose | H02J 3/383 |
| 2019/0027932 A1* | 1/2019 | Saers | H02J 3/38 |

OTHER PUBLICATIONS

Chanda, Sayonsom, et al., "Quantifying Power Distribution System Resiliency Using Code Based Metric", IEEE Transactions on Industry Applications, vol. 54, Issue 4, Feb. 21, 2018, 6 pages.

Chi, Yuan, et al., "A State-of-the-Art Literature Survey of Power Distribution System Resilience Assessment", 2018 IEEE Power & Energy Society General Meeting (PESGM), Portland, OR, Aug. 5-10, 2018, 5 pages.

* cited by examiner

RESILIENCY DETERMINATION IN A MICROGRID

CROSS-REFERENCE TO RELATED APPLICATIONS

This application is a national stage application of International Application No. PCT/EP2019/074111, filed on Sep. 10, 2019, which claims priority to European Patent Application No. 18195383.7, filed on Sep. 19, 2018, which applications are hereby incorporated herein by reference.

TECHNICAL FIELD

The invention relates to a method, arrangement and computer program product for determining resiliency in a microgrid.

BACKGROUND

Microgrids are of interest to use for local power generation and consumption and for connection to a main grid. Such a microgrid can include a number of assets used for generating, storing and/or consuming electric energy. If the microgrid is considered to be a system, then an asset may be an electric subsystem into and/or from which power may be delivered.

In a microgrid, it may be of interest to know about the resiliency with regard to disruptive events.

Resiliency can be defined as: "the ability to reduce the magnitude and/or duration of disruptive events. The effectiveness of a resilient infrastructure or enterprise depends upon its ability to anticipate, absorb, adapt to, and/or rapidly recover from a potentially disruptive event". This definition is from the National Infrastructure Advisory Council NIAC) 2009, Critical Infrastructure Resilience Final Report and Recommendations.

The resiliency may give support and facilitate in making decisions on adaptations of actions that can contribute to minimizing the recovery time in case of disruptive events (e.g. cyber attacks, disasters).

There exist a number of documents describing the determining of resiliency.

US 2017/0040839 does for instance show a three level microgrid control architecture for ensuring stable operation in face of contingencies. A resiliency metric is calculated from multiple parameters including a current system state; and the system is determined to assume a contingency level based thereon. The contingency level is the basis of operational decisions to ensure the least possible disruption.

US 2017/0046458 shows a system for performing power analytics on a microgrid through creating a virtual model of the grid's topology, measuring momentary parameters and simulating future events. The real-time measurements are to be compared to predicted values, deviations are assessed for severity and alarms are output for an operator if necessary. A system security index is calculated from various stability indices, showing the grid's ability to tolerate contingencies.

CN 103903058A shows a smart grid monitoring and control method based on an extensive assessment index system comprising safety and emergency capacity metrics. The metrics help in planning and decision-making.

The above described resiliency determinations are all centralized and somewhat complicated. It would therefore be of interest to use another and above all simpler and decentralized approach to the determining of resiliency for the microgrid.

SUMMARY

One object of the invention is therefore to obtain an alternative way of determining the resiliency of a microgrid that is simple and fast as well as based on a decentralized approach.

This object is according to a first aspect of the invention achieved through a method of determining resiliency in a microgrid comprising a number of assets, where each asset is a different type of electric energy subsystem in the microgrid, the method comprising:

obtaining status data about devices used to control the assets as well as about communication resources of this control, where the status data about the devices used to control the assets comprises hardware status data and/or software status data, determining, based on the status data, the health and availability of each asset to assist each of a plurality of functions for handling disruptive events in the microgrid, determining a resiliency index of the microgrid in performing the plurality of functions, the resiliency index being determined based on the individual asset health and availability of each asset concerning all the functions for handling disruptive events, providing the resiliency index to a control system of the microgrid, comparing, in the control system, the resiliency index with a least one threshold, and changing the control of the microgrid if any of the thresholds is crossed.

The object is according to a second aspect of the invention achieved through an arrangement for determining resiliency in a microgrid comprising a number of assets, where each asset is a different type of electric energy subsystem in the microgrid, the arrangement comprises at least one control unit configured to:

obtain status data about devices used to control the assets as well as about communication resources of this control, where the status data about the devices used to control the assets comprises hardware status data and/or software status data, determine, based on the status data, the health and availability of each asset to assist each of a plurality of functions for handling disruptive events in the microgrid, determine a resiliency index of the microgrid in performing said plurality of functions, the resiliency index being determined based on the individual asset health and availability of each asset concerning all the functions for handling disruptive events, compare the resiliency index with a least one threshold, and change the control of the microgrid if any of the thresholds is crossed.

The at least one control unit may comprise at least one commitment determining module arranged to obtain said status data, at least one resiliency determining module arranged to determine a resiliency index and a resilience investigating module arranged to compare the resiliency index with a least one threshold and change the control of the microgrid if any of the thresholds is crossed.

The arrangement may additionally comprise a number of local control units and a central control unit, where every commitment determining module is provided in a corresponding local control unit, the resilience investigating module is provided in the central control unit and the resilience determining module is provided in a local control unit or the central control unit.

The object is according to a third aspect of the invention achieved through a computer program product for determining resiliency in a microgrid comprising a number of assets, where each asset is a different type of electric energy subsystem in the microgrid, the computer program product comprising a data carrier with computer program code configured to cause at least one control unit to, when the computer program code is loaded into the control unit provide at least one commitment determining module arranged to obtain status data about devices used to control the assets as well as about communication resources of this control and determine, based on the status data, the health and availability of each asset to assist each of a plurality of functions for handling disruptive events in the microgrid, where the status data about the devices used to control the assets comprises hardware status data and/or software status data, provide at least one resiliency determining module arranged to determine a resiliency index of the microgrid in performing said plurality of functions, the resiliency index being determined based on the individual asset health and availability of each asset concerning all the functions for handling disruptive events, and provide a resilience investigating module arranged to compare the resiliency index with a least one threshold and change the control of the microgrid if any of the thresholds is crossed.

It is possible that the resiliency index is compared with a number of thresholds, one for each function for handling disruptive events and that the method further comprises selecting an asset to assist such a function for which the threshold has been crossed.

In is additionally possible that the at least one control unit when comparing the resiliency index is further configured to compare the resiliency index with a number of thresholds, one for each function for handling disruptive events and being further configured to select an asset to assist such a function for which the threshold has been crossed based on the relevance of the asset to the function.

The determining based on status data may thus comprise determining the health of each asset as well as the availability of each asset to assist each of a plurality of functions for handling disruptive events in the microgrid. This determination may additionally comprise the determining of the capacity of each asset to assist each of a plurality of functions for handling disruptive events in the microgrid.

The microgrid may comprise a busbar to which the assets may be connected. In this case an asset may be a subsystem for receiving and/or delivering energy to the busbar.

The assets may comprise at least one electric energy generating system. The assets may additionally or instead comprise at least one electric energy storing subsystem. The assets may additionally or instead comprise at least one electric energy consumption subsystem.

The status data may comprise status about inbuilt functionalities of the assets. This status data may be obtained through monitoring the inbuilt functionalities of the assets.

The status data may be obtained from the devices that are used in the control of the asset. It may be integrated in components used for controlling the asset. Alternatively or instead, status data may be obtained from outside of the microgrid, such as from third party providers and/or integrated in components.

The determined resiliency index may comprise a resiliency value for each of the plurality of functions for handling disruptive events. The determined resiliency index may additionally or instead comprise a total resiliency value obtained through the individual resiliency values for each of the plurality of functions for handling disruptive events. The resiliency index may as an example be provided as a vector or matrix of resiliency values.

The availability and health of an asset with regard to each of a plurality of functions for handling disruptive events in the microgrid may be provided as a number of values, where one value represents both the availability and health for one function. The availability and health values may be provided in a vector or matrix. When the capacity is determined, one such value may represent the capacity in addition to the availability and health.

According to a first variation of the first aspect, the method further comprises obtaining the relevance of each asset to each of the functions for handling disruptive events, wherein the resilience is determined also based on the relevance.

According to a corresponding first variation of the second aspect, the at least one control unit is configured to obtain the relevance of each asset to each of the functions for handling disruptive events, wherein the at least one control unit when determining the resilience is further configured to determine the resilience also based on the relevance.

Also, the relevance of an asset to each of the functions may be provided as a number of values, one for each function.

According to another variation, the method comprises determining, for each asset, a function commitment defining support given to the functions that handle disruptive events, where the function commitment of an asset comprises the availability, health, relevance and optionally also capacity for each of the plurality of functions that handle disruptive events. The functions that handle disruptive events may comprise at least one of a power balance function, a voltage control function, a frequency control function and a black start function.

According to a corresponding variation of the second aspect the at least one control unit is configured to determine, for each asset, a function commitment defining support given to the functions that handle disruptive events, where the function commitment of an asset comprises the availability, health, relevance and optionally also capacity for each of the plurality of functions that handle disruptive events.

The microgrid may be connected to an external grid via a circuit breaker.

According to yet another variation of the first aspect, the obtaining of status data then comprises obtaining status data of the circuit breaker and the method comprises the further step of adjusting the relevance of at least one of the assets based on the status of the circuit breaker.

According to a corresponding variation of the second aspect, the at least one control unit, when obtaining status data, is further configured to obtain status data of the circuit breaker and being further configured to adjust the relevance of at least one of the assets based on the status of the circuit breaker.

The microgrid may furthermore have an overall control functionality.

According to yet another variation of the first aspect, the obtaining of status data may then comprise obtaining status data also about the overall control functionality and the determining of the health, availability and optionally also capacity of each asset to assist each of a plurality of functions for handling disruptive events may be based also on the status data of the overall control functionality.

According to a corresponding variation of the second aspect, the at least one control unit, when obtaining status data is further configured to obtain status data also about the overall control functionality and when determining the health, availability and optionally also capacity of each asset to assist each of a plurality of functions for handling disruptive events is further configured to determine this health, availability and optionally also capacity also based on the status data of the overall control functionality.

The resiliency index determination may include a determination of thresholds for resiliency values, where a threshold may be related to a too high a value or a too low a value.

The determined resiliency index and any associated thresholds may be provided to the control system for off-line and online decisions.

The control system may be a system performing said above described overall control or a local control system of an asset. However, the control system may additionally be a remote control system, such as a virtual power plant for overall control.

The resiliency index and such thresholds may additionally be presented to an operator. These can be used as alarming signals for the different microgrid functions. Such alarming signals may optionally also allow the operator to make decisions in case there are unpredictable problems in the microgrid.

The resilience and optionally also such thresholds may additionally be provided to an Energy Management System (EMS) for planning operation and maintenance of the microgrid.

The resiliency index may additionally be used in an automatic microgrid operation.

In a further variation of the first aspect directed towards such automatic microgrid operation, the method further comprises comparing the resiliency index with a least one threshold and changing the control of the microgrid if any of the thresholds is crossed.

The selecting of the asset may be based on the relevancy of the asset to the function. The selecting may additionally or instead be based on the health, availability and optionally also capacity of the asset in relation to the function.

The determination of resiliency may be made continuously during the operation of the microgrid. The steps carried out for determining resiliency may thus be repeated regularly, such as cyclically.

The invention has a number of advantages. It provides valuable information on resiliency. This results in supporting microgrid functions for many applications. It also allows proactive control of the microgrid where preventive measures can be taken to improve microgrid resiliency reducing restart time or preventing shutdown and/or outage. It could result in saving corrective and preventive maintenance costs, particularly after natural disaster or cyber attacks.

BRIEF DESCRIPTION OF THE DRAWINGS

The present invention will in the following be described with reference being made to the accompanying drawings, where FIG. 1 schematically shows a microgrid with a number of assets being controlled using a local and a central control unit, FIG. 2 schematically shows one realization of the central control unit, FIG. 3 schematically shows one realization of a local control unit.

DETAILED DESCRIPTION

In the following, a detailed description of preferred embodiments of a system, method and computer program product for determining the resilience of a microgrid will be given.

Figure 1:
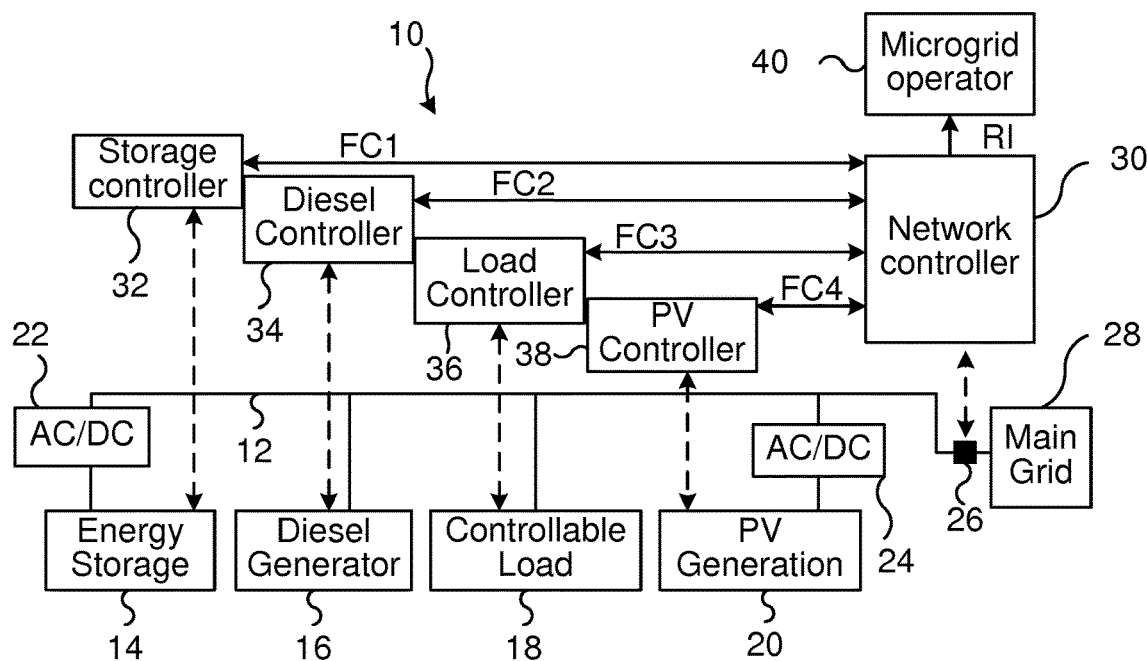

FIG. 1 schematically shows a microgrid 10 or main system and various control units for controlling the microgrid 10. The microgrid 10 may be considered to be a system being made up of a number of subsystems. It therefore comprises a busbar 12 to which a number of subsystems are connected. In the following such subsystems are considered to be assets. There is a first subsystem or asset 14 connected to the busbar 10 via a first interface device 22, a second subsystem or asset 16 directly connected to the busbar 12, a third subsystem or asset 18 also directly connected to the busbar 10 and a fourth subsystem or asset 20 connected to the busbar 12 via a second interface device 24. The busbar 12 is also connected to a main or external grid 28 via an external grid interface 26, which external grid interface 26 may comprise a circuit breaker.

An asset may be an electric energy subsystem in the microgrid 12. An asset may therefore be as subsystem for receiving and/or delivering electric energy to the busbar 12.

The first asset 14 may be an electric energy storage system, such as a battery system. The second asset 16 may be a first electric energy generating system, such as a diesel generator system, the third asset 18 may be a controllable electrical load or electric energy consuming subsystem and the fourth asset 24 may be a second electric energy generating system, for instance in the form of a photovoltaic (PV) subsystem employing photovoltaic elements.

The microgrid 10 may thus comprise at least one electric energy generating subsystem. Alternatively or additionally, the microgrid may comprise at least on electric energy storing subsystem. Alternatively or additionally, the microgrid may comprise at least one electric energy consuming subsystem It should here be realized that it is possible with further assets, such as fifth asset that may be a third electric energy generating subsystem in the form of a wind farm, which may also be connected to the busbar 12 via an interface device. The microgrid 10 may also comprise fewer subsystems.

The busbar 12 may be an alternating current (AC) busbar. Some of the assets may be operating with direct current (DC) and these are then connected to this busbar 12 via an interface device comprising an AC/DC converter. Some other assets may be operating with AC and these may therefore be directly connected to the busbar. In the example given above the first asset 14 is an energy storage system operating with DC and therefore the first interface device 22 comprises an AC/DC converter. The second asset 16 is a Diesel Generator system that operates with AC and may therefore be directly connected to the busbar 12. Also, the third asset 18, the load, operates with AC and may therefore also be directly connected to the busbar 12. The fourth asset 20, the PV subsystem, also operates with DC and therefore the second interface device 24 comprises an AC/DC converter.

It should be realized that the busbar 12 may as an alternative be a DC busbar, in which case subsystems operating with DC may be directly connected to the busbar and the subsystems operating with AC may be connected via a DC/AC converter. The external or main grid 28 may be an AC or a DC grid and depending on which type of grid it is and which type of busbar is used in the microgrid, the external grid interface 26 may comprise a suitable converter for converting between AC and DC.

It should additionally be realized that an AC subsystem may be connected to an AC busbar via an AC/AC converter and a DC subsystem may be connected to a DC busbar via a DC/DC converter.

In order to control each asset of the microgrid 10 for receiving and/or delivering energy, there is a corresponding local control unit comprising local control functionality. There is thus a first local control unit 32 for controlling the first asset 14, a second local control unit 34 for controlling the second asset 16, a third local control unit 36 for controlling the third asset 18 and a fourth local control unit 38 for controlling the fourth asset 20. As the first asset 14 is exemplified by an electric energy storage system, the first control unit 32 may be a storage controller, as the second asset 16 is exemplified by a Diesel Generator system, the second local control unit 34 may be a Diesel Controller, as the third asset 18 is exemplified by a controllable electric load the third local control unit 36 may be a load controller and as the fourth asset 20 is exemplified by a PV Generation subsystem, the fourth local control unit 38 may be a PV controller.

Each local control unit also communicates with a central control unit 30 or network controller, which is an overall control unit for the microgrid 10 comprising functionality for overall control of the microgrid 10. There is also an operator terminal 40 connected to the central control unit 30, which operator terminal 40 may present information to a microgrid operator. In the figure one type of information in the form of a Resiliency indicator RI is shown as being provided by the central control unit 30 to the operator terminal 40 for being presented.

In the figure the local control units 32, 34, 36 and 38 are shown as transmitting four function commitments FC1, FC2, FC3 and FC4 to the main control unit 30, which are indications of availability, health and relevance.

Each control unit may be realized as hardware such as a processor with associated memory and software, such as a control module comprising control functionality such as overall or local control functionality. The local control functionality may be provided for controlling a corresponding asset, i.e. to control a subsystem. Such control may comprise control to deliver electric energy to and/or from the subsystem. Some of the subsystems such as the Diesel Generator subsystem and the PV Generation subsystem may only be capable to deliver electric energy, some of the subsystems, such as the Controllable Load subsystem, may only be able to receive electric energy, while other systems such as the energy storage subsystem may be able to both deliver and receive electric energy.

Each control unit may also have a communication interface for communication with other control units within the microgrid 10 or entities outside of the microgrid 10.

Figure 2:
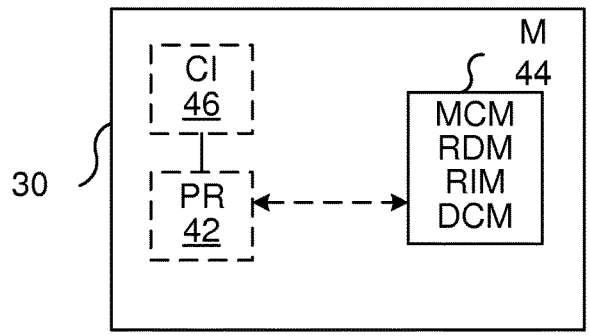

FIG. 2 schematically shows one realization of the central control unit 30. The central control unit 30 comprises hardware in the form of a processor PR 42 and an associated program memory M 44 comprising computer program instructions. The computer program instructions comprise instructions for realizing a main control module MCM with overall microgrid control functionality, instructions for realizing a resiliency determining module RDM, instructions for realizing a resilience investigating module RIM as well as optionally also instructions for realizing a data collection module DCM. The main control module MCM is an overall control module of the microgrid that considers individual control performed by the local control units. There is also a first communication interface CI 46 connected to the processor 34 for allowing the main control module MCM to communicate with other control modules, such as local and external control modules. Also, the resiliency determining module RDM and perhaps also the resilience investigating module RIM may communicate via this communication interface 46.

Figure 3:
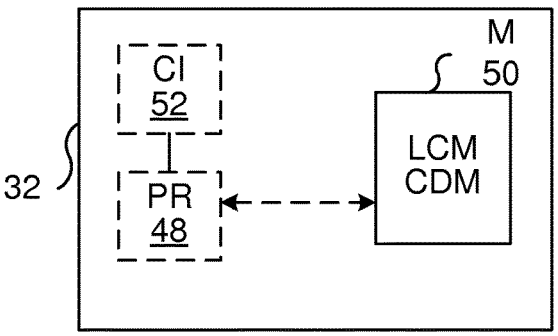

In a similar manner FIG. 3 schematically shows the realization of a local control unit, here exemplified by the first local control unit 32. The local control unit 32 comprises hardware in the form of a processor PR 48 and an associated program memory M 50 comprising computer program instructions. The computer program instructions comprise instructions for realizing the above-mentioned local control module LCM with local control functionality, which in the example given above is the energy storage control module. There is also here a commitment determining module CDM. The local control unit 32 also comprises a communication interface CI 52 connected to the processor 48 for allowing the local control module LCM to communicate with other control modules, such as the main or overall control module, external control modules, the data collection module and other commitment determination modules. Also, the commitment determining module CDM may use the communication interface 52 for communicating with commitment determining modules of other local control units as well as with the resiliency determining module RDM, the data collection module DCM and possibly also with the resilience investigating module RIM.

The exemplifying microgrid 10 disclosed above has distributed control, where a local control unit optimizes the behaviour of the controlled subsystem to perform corresponding microgrid functions in the best manner. To achieve this goal, each asset should share its conditions with other assets through the local control unit. Thus, the local control unit for each asset has the possibility to make the best decision plan at each time based on the assigned functions in the microgrid as well as the conditions of all microgrid assets (including its own conditions).

As was mentioned earlier, resiliency to disruptive events is an important issue in such a microgrid. It is therefore of interest to determine a resiliency, perhaps as a resiliency indication, for instance in the form of a resiliency index, which indication may be used in an overall control or an Energy Management System (EMS).

Resiliency requires a system perspective and situation awareness that can help to understand incidents as a complex imbedded process occurring at the intersection of natural and human forces across multiple scales, evolving and changing over time.

One could summarize the key elements to improving resiliency of microgrids to be:

Monitoring capacities of the assets with associated components and connectivity: hardware, software, communication etc. (e.g. state, functionality availability, environmental conditions, etc.)

Situation awareness (ability to elaborate fast the data and extract valuable information about the occurring incidents and effective communication to the human operators that should take actions)

Fast adaptation capacity (fully or partially automatized) of the microgrids configuration, production and load that can help to recover in minimized times.

The microgrid system should thus be capable of determining resiliency for the microgrid operator based on the conditions such as health and capacity of the microgrid assets and on the availability of particular functionalities, which resiliency may be determined through determining resiliency indicators.

Some of the important functions that are used to handle disruptive events and which a microgrid is expected to provide are as follows:

Power balance
Voltage control
Frequency control
Black start

Resiliency is according to various aspects of the invention determined for a number of functions that handle disruptive events, which functions are therefore also termed disruptive event handling functions.

According to various aspects of the invention, resiliency is determined based on an investigation into the status of the different types of assets. Each asset is thus investigated separately with regard to status and the impact of each asset on each disruptive event handling function may then be presented, for instance in one or more resiliency indicators. It is in addition possible that the status of the overall control functionality and/or the connection to the main grid via the circuit breaker in the external grid interface 26 is investigated and the impact of one or both of these on the disruptive event handling functions considered.

Figure 4:
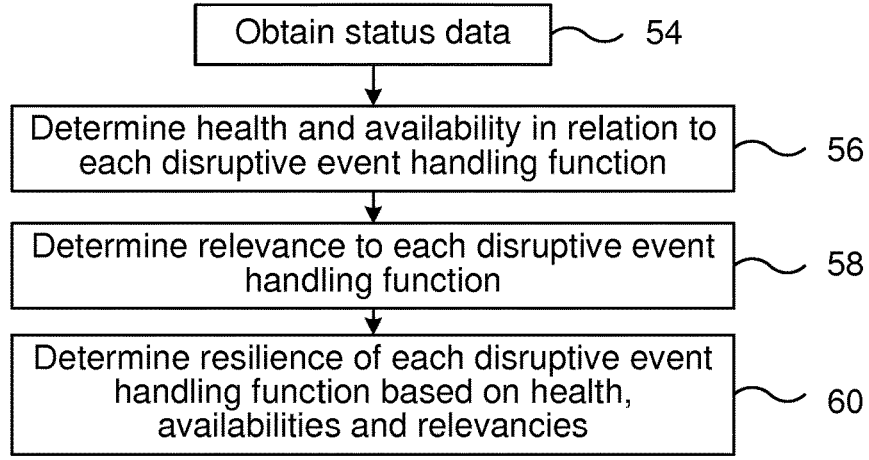
FIG. 4 shows a flow chart of a number of method steps in a method of determining resiliency in the microgrid, FIG. 5 schematically shows a flow chart of a number of method steps for using the determined resiliency index in influencing the operation of the microgrid.

How this may be done will now be described with reference being made also to FIG. 4 which shows a number of method steps in a method of determining resiliency for the microgrid 10, which method steps are being performed by the resilience determining module RDM of the central control unit 30 and the different commitment determining modules CDM of the central and local control units 32, 34, 36 and 38.

The method starts with each commitment determining module CDM associated with the different assets 14, 16 and 18 obtaining status data of each asset, step 54. Optionally also the data collection module DCM of the central control unit 30 obtains status data of the overall control functionality and/or the circuit breaker in the external grid interface.

This means that in the example system of FIG. 1, the commitment determining module CDM being implemented by the first local control unit 32 obtains status data related to the first asset 14, that the commitment determining module of the second local control unit 34 obtains status data related to the second asset 16, that the commitment determining module of the third local control unit 32 obtains status data related to the third asset 18 and that the commitment determining module of the fourth local control unit 38 obtains status data related to the fourth asset 20. Optionally also the commitment determining module CDM of the central control unit 30 obtains status data related to the main control module MCM and/or status data related to the circuit breaker in the externa grid interface 26. The data collection module DCM may transmit status data it has collected to the commitment determining modules CDM of the local control units The status data of an asset and of the overall control functionality, if used, may more particularly comprise status data concerning the performing of the control functionality. This is according to aspects of the invention data about devices used to implement the control modules, i.e. data about the different control units 30 32, 34, 36 and 38 used to perform the overall control functionality and the local control functionality related to the assets. The status data may more particularly be data about the hardware and/or software of the control units. The status data of an asset thus comprises data about the processor and program memory of the local control unit controlling the asset as well as or data about the local control modules LCM stored in these memories. The status data also comprises communication related data, which is data about the communication resources available for this local control module, which are the communication resources, such as the bandwidth, used by the communication interfaces of the local control units. The status data of the main control may in turn comprise data about the processor and program memory of the central control unit as well as data about the main control modules stored in these memories. The status data also comprises data about the communication resources, such as the bandwidth, available for this main control module, which are the communication resources used by the communication interface of the central control unit. The status data may comprise status about inbuilt functionalities of the assets, which may be obtained through the commitment determining module CDM monitoring the inbuilt functionalities of the assets. The status data may additionally be obtained from the devices that are used in the control of the asset. It may more particularly be integrated in components used for controlling the asset. Alternatively or instead, status data may be obtained from outside of the microgrid, such as from third party providers.

The status data of the circuit breaker may comprise data of if it is open or closed.

In the example of the first local control unit 32, the commitment determining module CDM thus obtains status data related to the processor 48 and memory 50, status data about the local control module LCM as well as status data about the communication resources available to the communication interface 52. Optionally it also obtains status data related to the processor 42, memory 44 and communication interface 46 and/or the circuit breaker.

The device related status data may comprise limitations in the hardware and software in performing additional functions, such as limitations in remaining memory space. It may also comprise data about changes to the hardware and/or software as well as data about previous faults and failures. Asset related status data may comprise limitations in the control of the asset, such as available power, headroom and control modes as well as data about supported features.

Based on this data a determination is then made of the availability, health and optionally also capacity, i.e. the contribution capability, of each asset to the disruptive event handling functions, step 56. In this determination it is possible that the status data of the overall control functionality from the central control unit is also considered.

This means that in the example system of FIG. 1, the commitment determining module CDM of the first local control unit 32 determines the availability health and optionally also capacity of the first asset with regard to each of the disruptive event handling functions. This may involve determining available memory space and processing capability that may be assigned to disruptive event handling functions in relation to the asset in both the local control unit and the central control unit. In one variation this may involve equally assigning the excess capacity between the different disruptive event handling functions. The determining of availability, health and optional capacity may instead or in addition comprise investigating maintenance, loading and failure rate of hardware and software versions of software. The commitment determining module of the second, third and fourth local control units 36, 28 and 40 also perform such determinations with respect to the assets controlled by these control units.

It is additionally possible that the status data of the main control is transferred from the data collection module DCM of the central control unit 30 to the different commitment determining modules of the local control units in order to be considered in determining the availability of the individual assets to each of the disruptive event handling functions. The status of the hardware, software and communication capability of the central control unit may be combined with the status the hardware, software and communication capability of a local control unit in order to determine the availability of the asset for the different functions.

The health of an asset and the availability and capacity of this asset to assist the disruptive event handling functions may be provided as a number of values, one for each function, for instance in the form of a vector. The above-mentioned healths, availabilities and optional capacities may additionally be expressed as degrees of health, availability and capacity to the disruptive event handling functions, for instance in the form of percentages, where a percentage may be formed in respect of the heath, availability and capacity Thereafter an optional step of obtaining the importance or relevance of each asset and optionally also the main control and/or circuit breaker to each disruptive event handling function may be performed, step 58. The commitment determining module CDM of the first local control unit 32 may thus obtain the relevance of the first asset to each of the functions, the commitment determining module of the second local control unit 34 may obtain the relevance of the second asset to each of the disruptive event handling functions, the commitment determining module of the third local control unit 36 may obtain the relevance of the third asset 18 to each of the disruptive event handling functions and the commitment determining module of the fourth local control unit 38 may obtain the relevance of the fourth asset to each of the disruptive event handling functions. These may be pre-determined and stored as relevance values in a relevance table.

The relevance of an asset to the disruptive event handling functions may thus be provided as a number of values, one for each function. The relevancies may additionally be expressed as degrees of relevance to the disruptive event handling functions, for instance in the form of percentages, for instance in a vector.

It is possible that an asset cannot be used for a function. This may be reflected by the relevance. An asset may also be unable to accommodate processing requirements for performing or assisting in performing the disruptive event handling function, which may also influence the relevance. It is furthermore possible that the relevance of an asset may influence the availability. The availability of an asset that has a low relevance for one function may be higher for other functions that it has some relevance to. An asset that is not able to implement a disruptive event handling function may have zero availability for this function and thereby availability with regard to other disruptive event handling functions that it is able to participate in may be increased.

Take the function of frequency control for instance, as the first asset 14 uses DC, it cannot be employed for assisting this function. The relevance of the first asset 14 for this function may therefore be zero.

The same can be said for capacity, an asset that does not have the capacity may also be unable to assist a fault handling function. A fully charged energy storage system may for instance not be able to receive any additional energy. It may thereby have zero capacity for a function that needs to store energy.

The relevance to this function may therefore be zero. For a function that requires energy, the relevance may instead be high.

The relevance and/or availability of an asset for a function may also be influenced by the status of the circuit breaker in the external grid interface 26. The relevance of an asset for an event handling function may more particularly be adjusted based on the status of the circuit breaker. The status of the circuit breaker may be relevant for all disruptive event handling functions that require the use of the external main grid but lacks relevance for disruptive event handling functions that do not. Therefore, the relevance of an asset for a disruptive event handling function requiring a connection to the main grid may be set to zero if the status of the circuit breaker is that it is open.

The different commitment determining modules CDM of the different local control units 32, 34, 36 and 38 may then transfer one or more measures of the availability, health and optionally also the capacity and/or relevance of the corresponding asset for all disruptive event handling functions to the resilience determining unit RDF of the central control unit 30. This measure may be a function commitment, which is a commitment made by the commitment determining module CDM that may specify if and in what degree the asset may be used in handling the different disruptive event handling functions. As is discussed above the status of the main control and/or the circuit breaker may be used in the determining of the function commitments made by the commitment determining modules of the local control units.

The first local control unit 32 therefore transfers a first function commitment FC1, the second local control unit 34 transfers a second function commitment FC2, the third local control unit 36 transfers third function commitment FC3 and the fourth local control unit 38 transfers a fourth function commitment FC4 to the resilience determining module RDM in the central control unit 30 via the communication interfaces 46 and 52.

Thereafter the resilience determining module RDM determines the resilience of the microgrid in relation to each disruptive event handling function based on the received function commitments, i.e. based on the health, availability, capacity and relevance of each asset in relation to each of the disruptive event handling functions, step 60. This resiliency may be provided in the form of one or more resiliency indicators RI, for instance realized as a resiliency index, provided to the operator terminal 40.

If there are four disruptive event handling functions, this may involve combining the healths, availabilities, capacities and relevancies determined by all the commitment determining modules in relation to the first disruptive event handling function into a first resilience value, combining the healths, availabilities, capacities and relevancies determined by all the commitment determining modules in relation to the second disruptive event handling function into a second resilience value, combining the healths, availabilities, capacities and relevancies determined by the commitment determining modules in relation to the third disruptive event handling function into a third resilience value and combining the healths, availabilities, capacities and relevancies determined by the commitment determining modules in relation to the fourth disruptive event handling function into a fourth resilience value. The resilience values for the different disruptive event handling functions may then be combined into a system resilience indication RI provided to the operator terminal 40 for being presented to an operator. The resiliency indicator RI may be in the form of one or more values, for instance as a vector or a matrix, where in the case of a vector one value may be provided for each disruptive event handling function. In the case of a matrix each position in the matrix may correspond to the resiliency of an asset in relation to a function. A row in the matrix may therefore correspond to a function, while a column may correspond to an asset.

The resiliency determination may additionally include a determination of borders or thresholds for the total value and/or for the individual resiliency values, where a border may be related to a too high a value or a too low a value.

The resiliency and optionally the corresponding borders or thresholds may additionally be presented to an operator for use as alarming signals for the different microgrid functions. Such alarming signals may optionally also allow the operator to make decisions in case there are unpredictable problems in the microgrid.

The resilience and optionally also such thresholds may additionally be provided to an EMS system for planning operation and maintenance of the microgrid.

The resiliency may additionally be used in an automatic microgrid operation.

When being presented to an operator, the operator may act on the resilience indication RI or any of the individual resilience values if these are outside of the borders or thresholds set for the resilience.

It should be realized that the determination of resiliency may be made continuously. The above-mentioned method steps may therefore be repeated regularly, such as cyclically.

The operator may thereby evaluate the microgrid resiliency through the defined and desired microgrid functions. Moreover, the assessment results could be used to provide appropriate alarming signals to the microgrid operator for the different microgrid functions.

Figure 5:
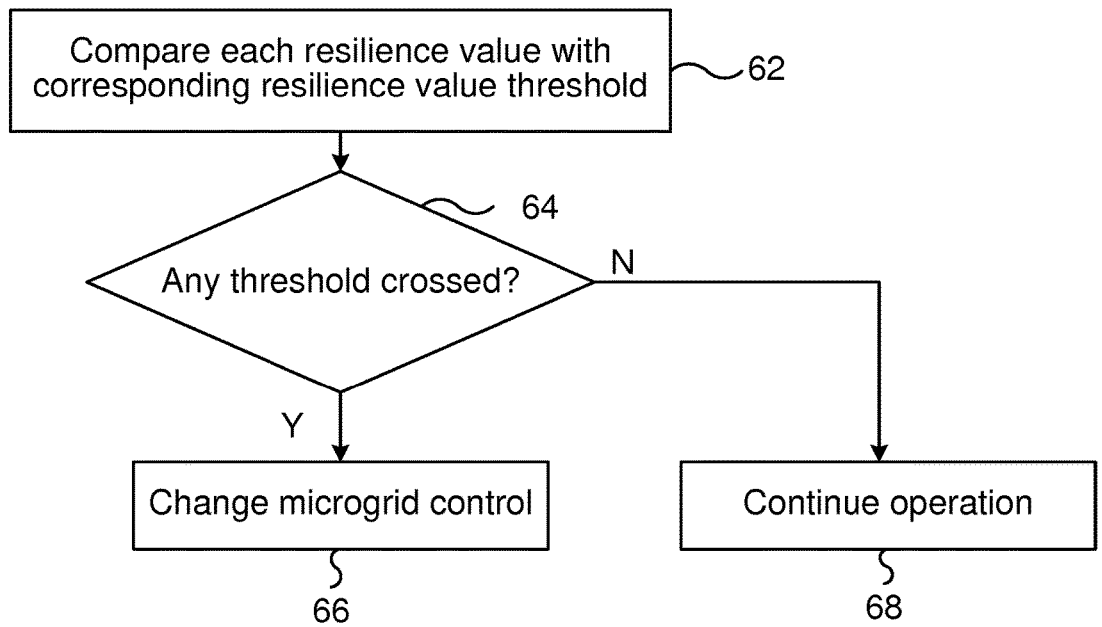

When resiliency is used in an automatic microgrid operation, it is possible that the central control unit 30 uses the resilience investigating module RIM. The operation of this module will now be described with reference being made to FIG. 5, which shows a number of method steps for performing the investigation.

The resilience investigation module RIM may compare the resiliency with at least one threshold, step 62. This may involve comparing each determined resiliency with a corresponding resiliency threshold. The comparing may as an example involve comparing the overall resiliency value with a threshold and/or one or more of the individual resiliency values determined for the disruptive event handling functions with corresponding thresholds. If no threshold is crossed, step 64, then operation of the microgrid is continued in the same way as before the investigation. However, if any threshold is crossed, step 64, the control of the microgrid 10 is changed in order to improve the resilience, step 66. This improvement may involve the resilience investigation module RIM informing the main control module MCM about which disruptive event handling function needs to have its resiliency increased. It may additionally involve selecting one or more asset that is to assist in the increasing of the resiliency, which selection may be based on the relevancies of the assets. It is for instance possible to select and use the asset having the highest relevance with the highest possible health, availability and optionally also capacity. It is also possible that the selection is based on the healths, availabilities and optionally also capacities of the asset. The main control module MCM may then change the operation of one or more of the assets, such as the selected assets, that have an influence on this resiliency. This may involve ordering a local control unit to change the control of the corresponding asset.

Through the provision of a measure of the resiliency of a microgrid, for instance in the form of a resiliency indicator, it will be possible to implement fully or partially automatized adaptation actions (e.g. Reconfiguration, islanding, load shedding, etc.) It may also minimize the recovery time and cost of the microgrids in case of disasters or unpredictable disruptive events (e.g. Extreme weather events, cyber-attacks, etc.).

Figure 6:
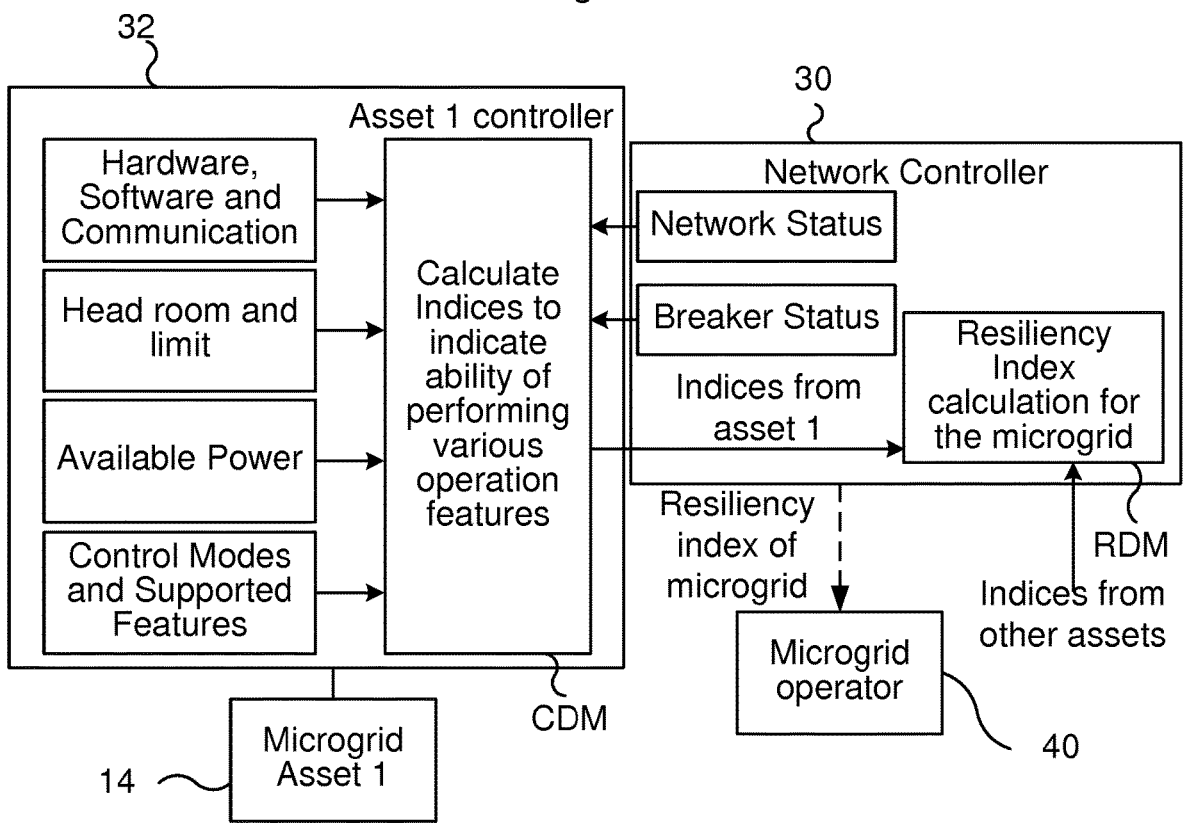
FIG. 6 shows data exchange between as well as various determinations being made by the central control unit and a local control unit.
Figure 7:
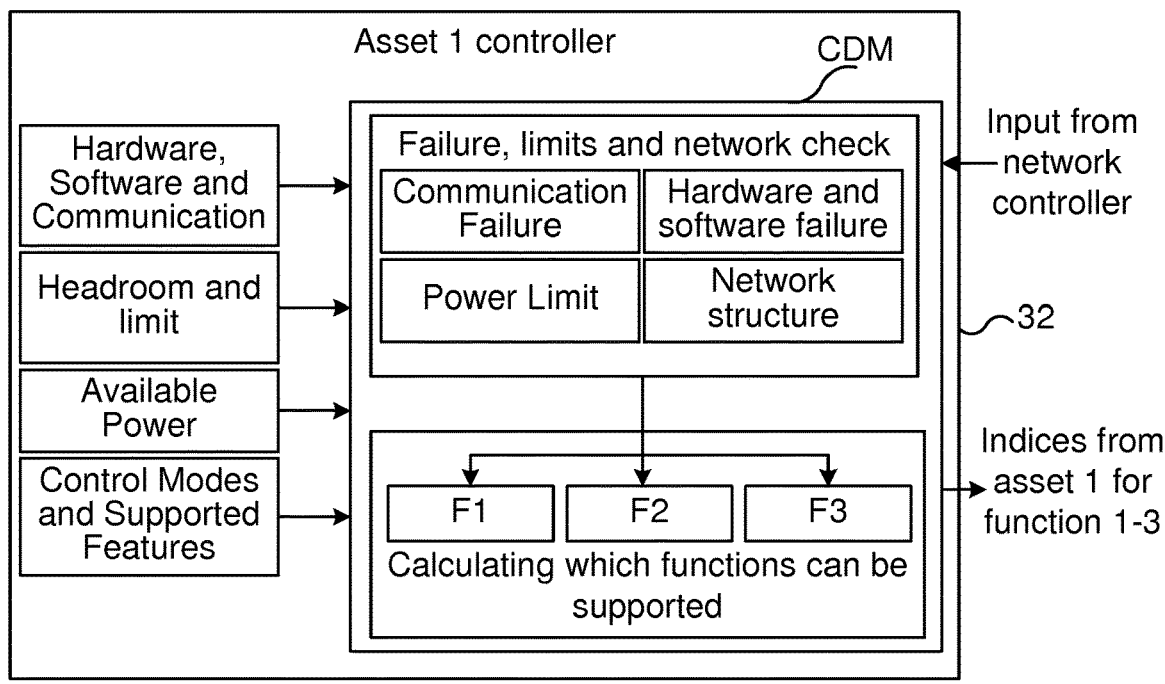
FIG. 7 shows a calculation of a function commitment for different desired functions.
Figure 8:
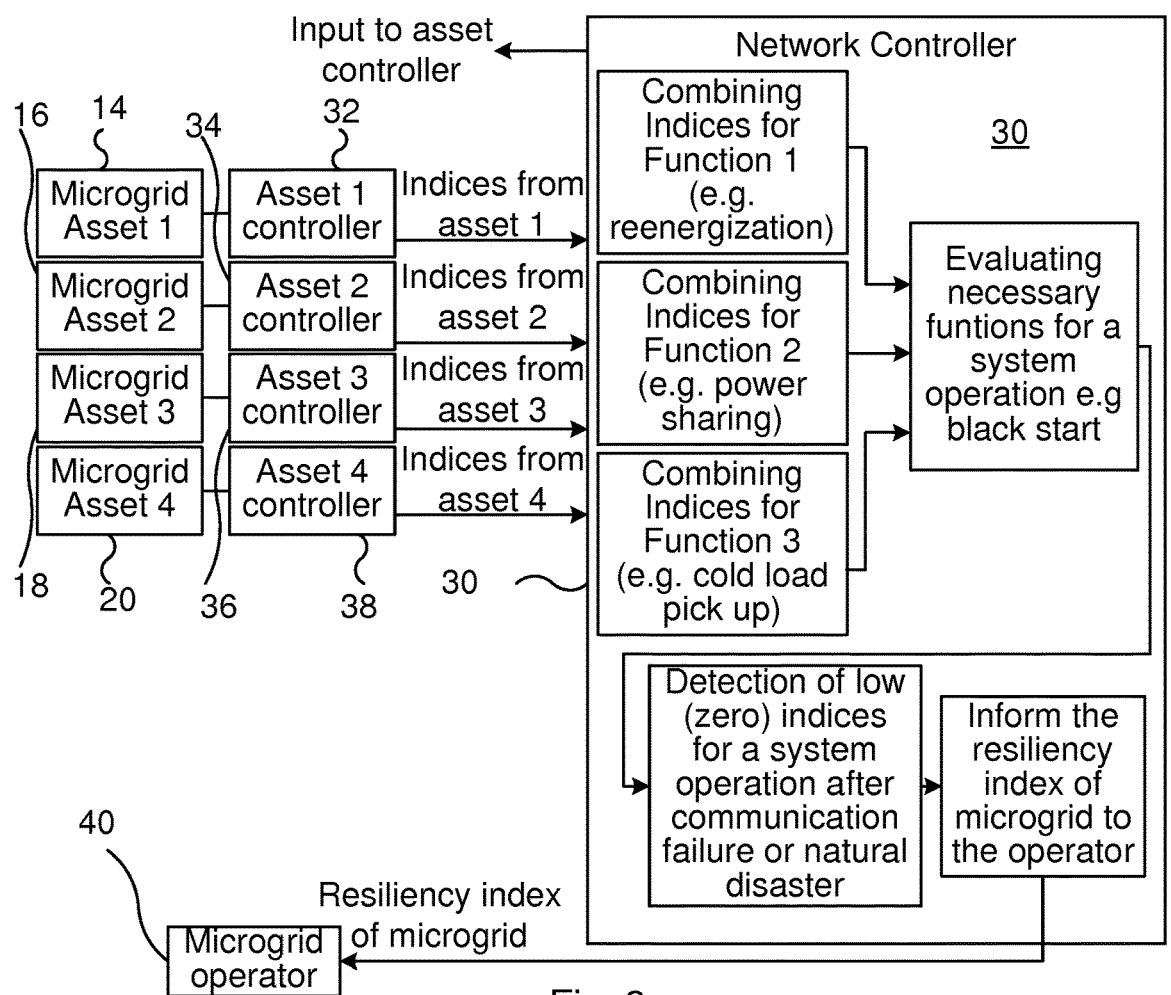
FIG. 8 shows the combination of all such received function commitments by the central control unit to assess resiliency.

Now one specific variation of the handling of resiliency will be described with reference being made to FIGS. 6, 7 and 8, where FIG. 6 shows data exchange between the central control unit and a local control unit, FIG. 7 shows a calculation of a function commitment for different desired functions in the local control unit and FIG. 8 shows the combination of all such commitments by the central control unit to assess resiliency.

1. Each health, availability and optional capacity or asset state may be characterized by a set of indices, St(i), named "asset status index". St(i) may be an array of scalar indices. Each index denotes over a scale (e.g. from 0 till 5, 0% to 100%, etc) the health state of the monitored characteristics of the asset (e.g. hardware and communication state, control modes and supported features, available stored energy, etc.).

2. The asset status indices St(i) (part of it or all) determined by a commitment determining module CDM of a local control unit may be broadcast to the other commitment determining modules of the other local control units and to the resiliency determining module RDM of the central control unit 30. The resiliency determining module of the central control unit 30 has the task of monitoring the status indices of the network and the breaker in the interface 26, 3. Each local control unit calculates a Function Commitment, for instance in the form of a "Function Commitment index", (FC1, FC2, FC3 and FC4 in FIG. 1) based on a functionality, health, availability and capacity model of all assets, for the asset controlled (e.g. energy storage, diesel generator, PV, etc.). In addition to availability, health and capacity, the commitment indexes of an asset indicate its ability of performing various operation features based also on the condition of the studied asset as well as the conditions of the other assets in the grid, i.e., other components, network, and limits.

A suggested way to calculate the commitment is as an index, which is provided in equation (1), in which F(Asset i, Functions j) provides the contribution of Asset i in providing function j, and $S_{Asset}$ represents the status or availability of different microgrid assets:

$$F(\text{Asset } i, \text{Function } f) = f(S_{Asset\ 1}, S_{Asset\ 2}, \ldots, S_{Asset\ i}, \ldots) \quad (1)$$

For instance, the commitment of Diesel Generator in providing the Power Balance could be computed through:

$$F(\text{Diesel Generator}, \text{Power Balance}) = f(S_{pv}, S_{Storage}, S_{Diesel\ generator}, \ldots) \quad (2)$$

Each local control unit calculates commitment indices for the different disruptive event handling functions F1, F2, F3 that the specific asset is supposed to participate in (e.g. Power balance, Voltage Control, Frequency Control, Black Start, etc.). The calculation considers hardware, software, communication availability, health and capacity such as control limits, such as headroom and limit and available power and modes, such as local control modes and supported features. An explanatory example is shown in FIG. 7. For the implementation of the function commitment module, it may be required to implement failure limits and network checks, FIG. 7, which define the thresholds of the status index that indicate a condition of anomaly of clear fault conditions.

The failure investigation may comprise investigating communication failure, hardware and software failure, power limits and network structure.

4. Following the design principle of distributed control, the function commitment indexes of asset i in function j, i.e., F(i,j), of each microgrid asset is broadcast to all the other local control units and to the central control unit. Broadcasting limitations can be implemented if needed. The central control unit 30, FIG. 8, operates as data aggregator and it has also the task of monitoring the network and breaker function commitment index and broadcast them to all the local control units.

5. In the central control unit 30 the resiliency indexes are finally calculated, FIG. 8. The resiliency determining module has as input the function commitment Indexes, F(i,j), collected from all the local control units and gives as output a set of scalar indexes, the resiliency indexes.

For each function (e.g. power balance, frequency control and voltage control, black start, etc.) needed for the recovery of the microgrid in case of a disruptive event, the microgrid resiliency is evaluated a ranking of all the assets that can provide such function on a scalar index (e.g. 0%-100%). That is to say, the resiliency of the microgrid with respect to function j may be calculated through the following equation:

$$\text{Resilicy Index (Function } f) = g(F(1,f), F(2,f), \ldots, F(i,f), \ldots) \quad (3)$$

These indexes are communicated in a concise and effective way to the microgrid operator via the operator terminal 40. For each resiliency index an automatic alarm threshold can be implemented in the central control unit and communicated to the microgrid operator.

In case of disaster the Microgrid Operator can have information for each function needed for the restoration about:

Availability of restoration functionalities in the microgrid
Which assets can perform such functionalities
Indications on the derating of the assets after a disaster
Which assets need priority in repairing interventions The operator and/or the central control unit finally can make decision on the adaptations actions that can contribute to minimize the recovery time in case of disruptive events.

The main benefits of the proposed scheme can be summarized as follows:

1. The most important advantage of the proposed approach is that it provides valuable information on resiliency. This results in supporting microgrid functions for many applications.

2. It will also provide smarter control of the microgrid where preventive measures can be taken to improve microgrid resiliency reducing restart time.

3. It could result in saving a huge amount of corrective and preventive maintenance costs, particularly after natural disaster or cyber attacks.

Figure 9:
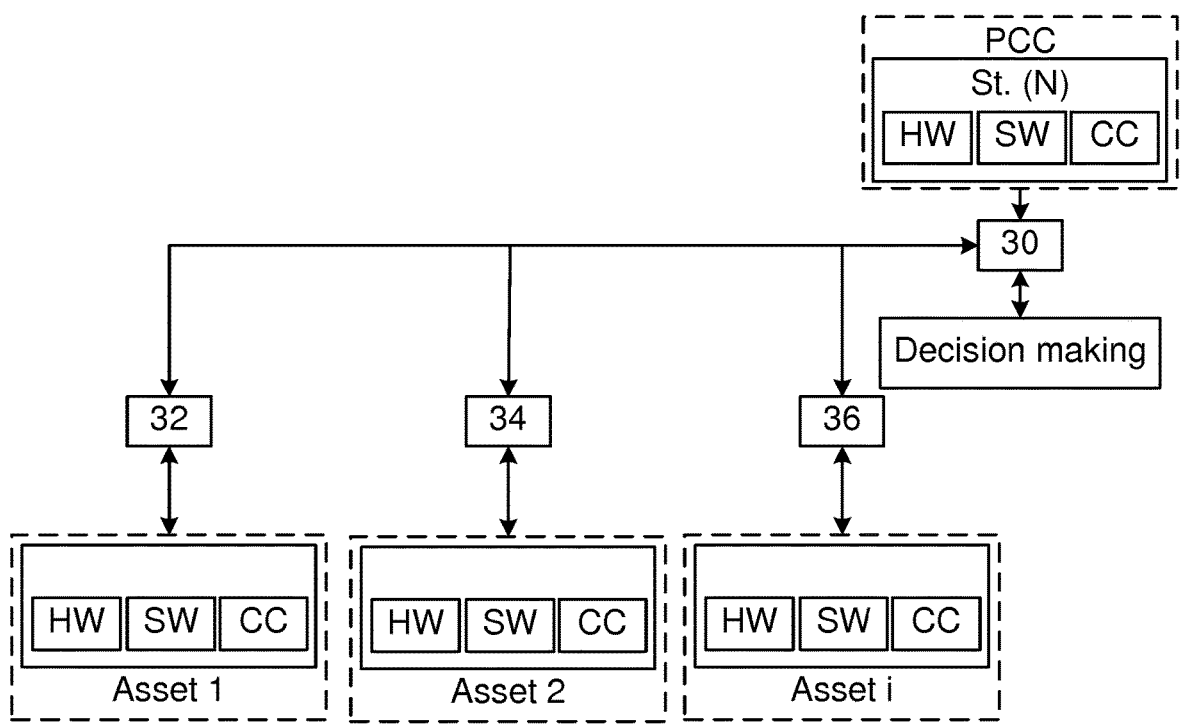
FIG. 9 shows a control schematic implementing resiliency determination in the central control unit based on processing performed in the central and a number of local control units.
Figure 10:
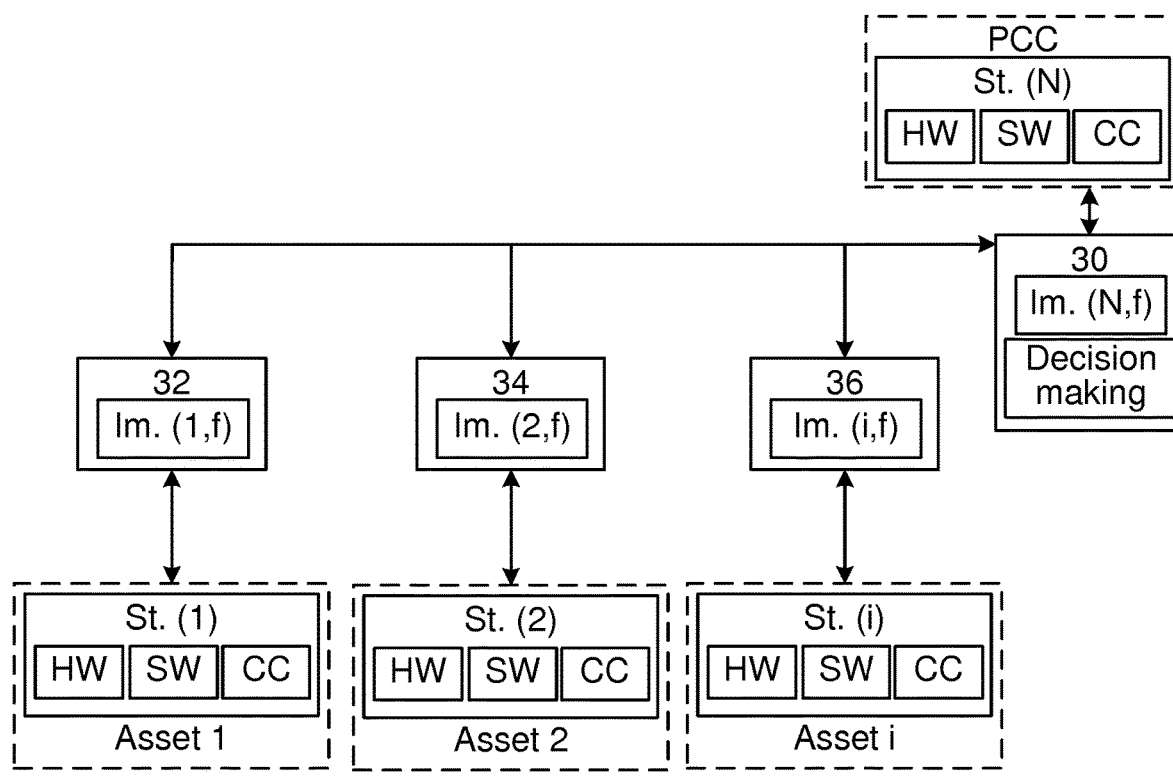
FIG. 10 shows an alternative control schematic implementing resiliency determination in the central control unit based on processing performed in the central and in a number of local control units.
Figure 11:
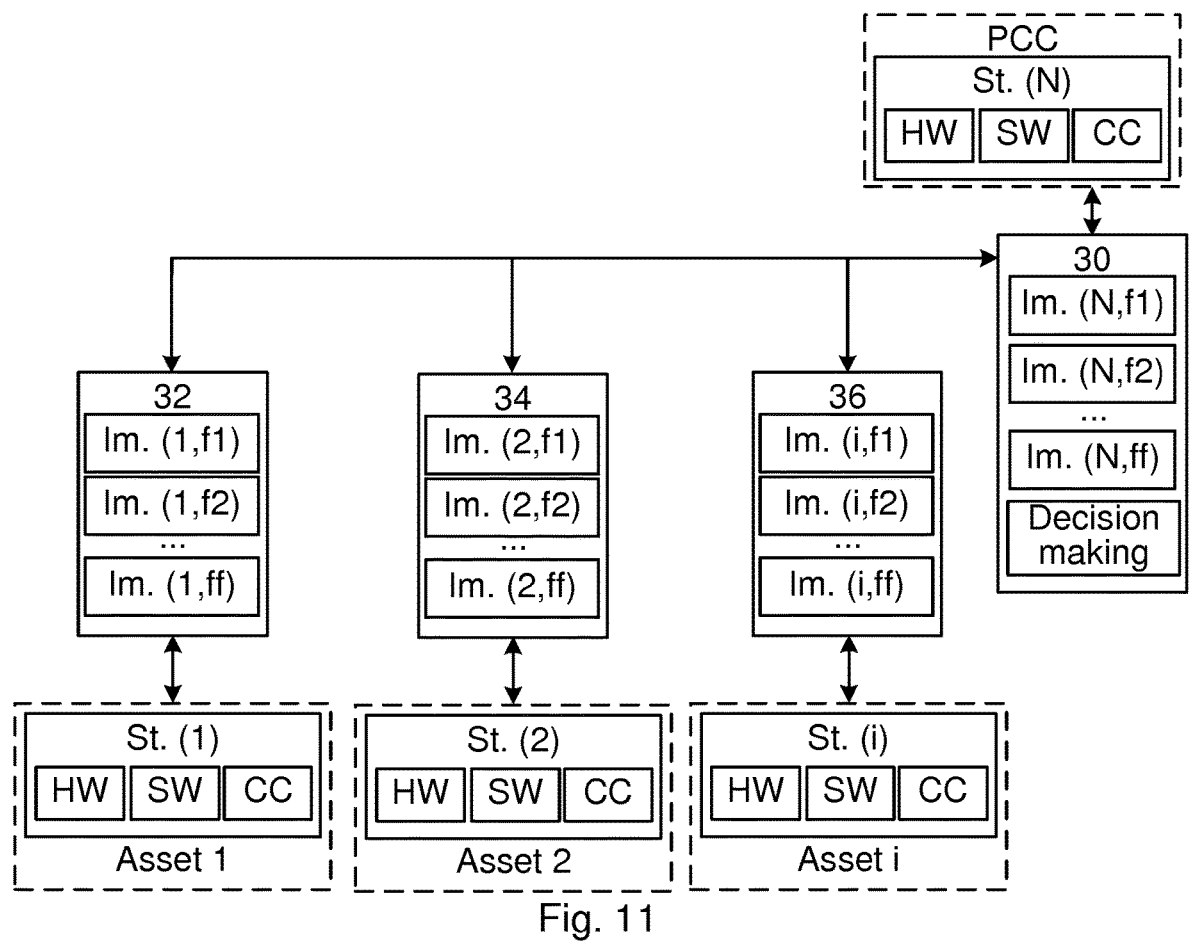
FIG. 11 shows another alternative control schematic implementing resiliency determination in the central control unit based on processing performed in the central and in a number of local control units.
Figure 12:
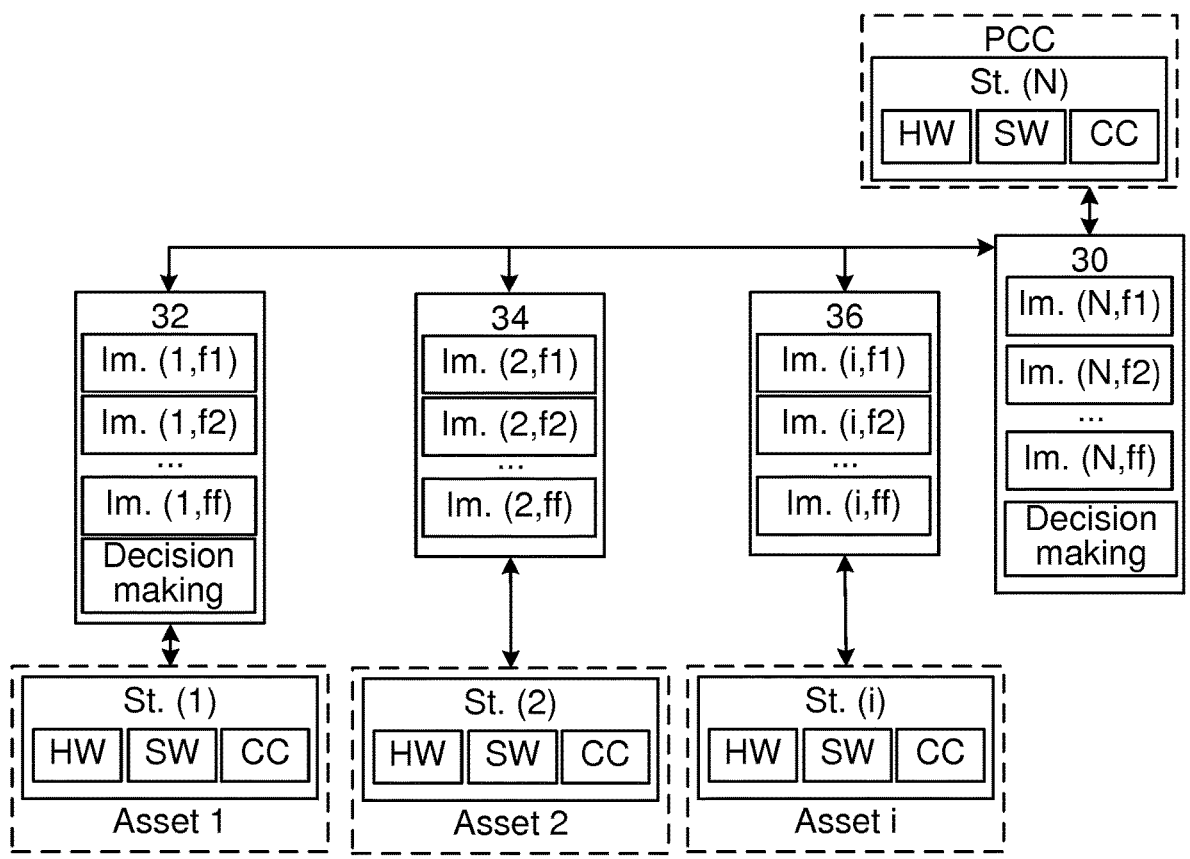
FIG. 12 shows a further alternative control schematic implementing resiliency determination in the central control unit and in a number of local control units.

Further implementation examples will now be given with reference being made to FIGS. 9. 10, 11 and 12, where FIG. 9 shows a control schematic implementing resiliency determination in the central control unit based on processing performed in the central and in a number of local control units, FIG. 10 shows an alternative control schematic implementing resiliency determination in the central control unit based on processing performed in the central and in a number of local control units, FIG. 11 shows another alternative control schematic implementing resiliency determination in the central control unit based on processing performed in the central and in a number of local control units, and FIG. 12 shows a further alternative control schematic implementing resiliency determination in the central control unit and in a number of local control units.

FIG. 9 depicts one control schematic of the considered microgrid. It can be seen that each microgrid asset has a local control unit which optimizes the operation of the corresponding asset based on the conditions of all microgrid assets as well as share the asset conditions with other microgrid assets.

It can be seen in FIG. 9 that each microgrid asset is modelled in the local control unit with three main blocks representing the software SW, hardware HW, and communication CC of the studied asset. These three types of status data can together describe the conditions of each microgrid asset, e.g., loading rate, capacity level (for energy storage), maintenance history etc. Therefore, all of these three parts may be used in each microgrid asset to describe the asset situation with a so called "asset status index" indicating the availability, health and capacity.

Please also note that the decision-making unit, which implements the resiliency determining module, is presented in FIG. 9 as a separate unit. As an alternative it could be included in any of the local control units as well as in the central control unit. It can be seen that resiliency may be determined solely based on availability obtained through status data The contribution of each asset in providing different desired functions may as was mentioned earlier be modelled through a set of indexes called function commitment indices. To simplify the calculation of commitment indices, the availability, health, capacity and relevance of each microgrid asset is presented through two indices, named asset status index St(i) and asset importance index Im(i, f). The former is obtained based on the three previously discussed fundamental parts defined for each microgrid asset (i.e., software, hardware, and communication), while the asset importance index Im(i, f), which is concerned with relevance, is determined based on the general situations of all microgrid assets and desired microgrid functionality.

FIG. 10 represents another way of operating the microgrid. It can be seen in this figure that the asset status index St. (i) is derived based on the asset internal conditions, while the asset importance index Im.(i,f) is determined inside the local control unit since it is also dependent to the conditions of other microgrid assets. The way these two indices may be calculated for each asset are more clearly explained in the following.

It should also be noted that the asset importance index Im.(i,f) can also vary for different microgrid functions, i.e. functions handling disruptive events, meaning that depending on the status of other components and also based on the number of assets which can provide different microgrid functions, the asset importance index of the studied asset might be different. For instance, assume the situation in which there are three or more assets in the microgrid (apart from the studied asset) that can provide microgrid function 1. However, the studied asset is the only asset in the microgrid that can provide function 2. In such situation, the asset importance index of the component for function 2 is much higher than the one for function 1. Accordingly, each microgrid asset has several asset importance indices depending on the number of considered microgrid functions. Figure ii illustrates a proposed control schematic considering several microgrid functions.

In addition, a control schematic which considers several microgrid functions as well as distributed control concept is presented in FIG. 12. In the schematic depicted in this figure, there are more than one local control unit that can perform the decision-making process.

It should be emphasized that in both FIGS. 11 and 12, the local control units which perform the decision-making process should present the required warning signals to the microgrid operator.

In operation, the asset status index St.(i) and the asset importance index Im.(i,f) may be calculated for each asset constantly. To calculate the asset status index St.(i), current and previous working conditions of all fundamental parts of each asset (i.e., software, hardware, and communication) may be evaluated and the asset status index is derived. To illustrate this index calculation more clearly, an example table (Table I) is suggested in the following.

TABLE I

| Asset part | Condition def. | Conditions quantify | Criticality value |
|---|---|---|---|
| Software status | Program version (S1) | New version | 1 |
| | | Old version | 2 |
| | Any software problem since last checkup (S2) | No | 1 |
| | | Yes | 2 |
| Hardware status | Time since last maintenance (H1) | <5 years | 1 |
| | | ≥5 years | 2 |
| | Average loading since last maintenance (H2) | <80% | 1 |
| | | ≥80% | 2 |
| | Initial failure rate (H3) | <0.2 f/year | 1 |
| | | ≥0.2 f/year | 2 |
| Communication status | Communication Technology (C1) | Type 1 | 1 |
| | | Type 2 | 2 |
| | Any software problem since last checkup (C2) | No | 1 |
| | | Yes | 2 |

According to this table:
Software status is equal to S1+S2 and can vary between 2 and 4.
Hardware status is equal to H1+H2+H3 and can vary between 3 and 6.
Communication status is equal to C1+C2 and can vary between 2 and 4.
Asset status index St. (i) is equal to S1+S2+H1+H2+H3+C1+C2 and can vary between 7 and 14.

Please note that the proposed value and items in this table are mere examples for illustrating the availability and relevance of assets.

Similar to the asset status index calculation, the asset importance index Im.(i,f) can also be calculated for each asset through a lookup table as the one suggested in Table 2.

TABLE II

| Function no. | Condition def. | Conditions quantify | Criticality value |
|---|---|---|---|
| Power balance | How many other assets can perform this function (P1) | More than one | 1 |
| | | Only one more | 2 |
| | | No more | 3 |
| | Placement in the MG regarding this function (P2) | Not important | 1 |
| | | Important | 2 |
| Voltage control | How many other assets can perform this function (V1) | More than one | 1 |
| | | Only one more | 2 |
| | | No more | 3 |
| | Placement in the MG regarding this function (V2) | Not important | 1 |
| | | Important | 2 |
| Frequency control | How many other assets can perform this function (F1) | More than one | 1 |
| | | Only one more | 2 |
| | | No more | 3 |
| | Placement in the MG regarding this function (F2) | Not important | 1 |
| | | Important | 2 |
| Black start | How many other assets can perform this function (B1) | More than one | 1 |
| | | Only one more | 2 |
| | | No more | 3 |
| | Placement in the MG regarding this function (B2) | Not important | 1 |
| | | Important | 2 |

In Table II MG is an abbreviation for Microgrid.
According to this table:
The asset importance index Im.(i,f) with respect to any of these four functions is equal to X1+X2 and can vary between 2 and 5, where X could be P, V, F, or B.

According to the above described operation, all asset status indices and asset importance indices of all assets are used in the next step to calculate the resiliency of the microgrid with respect to each desired function. Resilience is here determined as a Resiliency Index. To do so, the following equation may be used:

$$\text{Resiliency Index}(j) = \sum_{i=1}^{I} F(i, j) \qquad (4)$$

$$F(i, j) = \text{Im}(i, j) \cdot St(i) \qquad (5)$$

Using these equations, the decision-making unit implementing the resiliency determining module will calculate the level of risk for the microgrid with respect to each function and based on the obtained value and some predefined threshold levels, will show appropriate alarming signals to the system operator.

In a more advanced form of calculation for the importance index, variables such as "More than one", "Only one more", and "No more" in table II can have a dependence on the condition of the other assets. As an example, if two components are the only ones supporting function one, then there are More than one assets available. If however one of these assets have a high risk of failure due to a bad maintenance condition, then the other asset will become more important, as there are now "No more" assets that can provide this function securely. The importance index can in such an implementation have a decimal value to mark how bad the condition of the other parallel unit is.

There are a number of further variations that are possible to make to the microgrid described above. As could be seen the resiliency determining module may be placed in any control unit. Also, the resiliency determining module may be placed in any control unit. However, it should be combined with the resiliency determining unit.

The commitment determining module was above described as being distributed. It is provided in the different control units. It is as an alternative possible that there is one central commitment determining module placed in one of the control units, main or local. If this is done data that is used as input for determining a function commitment may then be provided to this control unit from all other control units.

One aspect is concerned with an arrangement for determining resiliency. The arrangement comprises the modules involved in this determination such as the commitment determining modules, the resilience determining module and the resilience investigating module. It optionally also comprises the data collection module. The arrangement may also comprise the control units and in which these modules are implemented, such as the local control modules and the central control module.

The modules may be realized as hardware modules, such as Application Specific Integrated Circuits (ASICs) and Field-Programmable Gate Arrays (FPGAs). However, as was mentioned above they may also be realized as software, i.e. computer program code.

Figure 13:
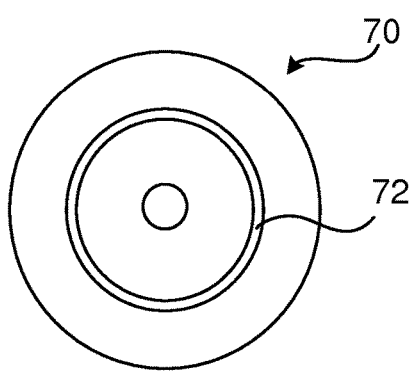
FIG. 13 shows a computer program product comprising a data carrier with computer program code, in the form of a CD-ROM disc, for implementing the resiliency determining and investigating functionality.

This computer program code used to implement the resiliency determining module, and the commitment determining modules and optionally also the data collecting module and the resiliency investigating module may also be provided on one or more data carriers which perform the activities of these modules when being operated on by a processor. One such data carrier 70 with the previously mentioned computer program code 72, in the form of a CD ROM disc, is schematically shown in FIG. 13. Such a computer program may as an alternative be provided on a server and downloaded therefrom into a computer in order to obtain the system model creating and simulation device.

While the invention has been described in connection with what is presently considered to be most practical and preferred, it is to be realized that the invention is not to be limited to the disclosed embodiments, but on the contrary, is intended to cover various modifications and equivalent arrangements. The invention is only to be limited by the following claims.

The invention claimed is:

1. A method of determining resiliency in a microgrid comprising a number of assets, where each asset is a different type of electric energy subsystem in the microgrid, the method comprising:
obtaining status data about devices used to control the assets as well as about communication resources of this control, where the status data about the devices used to control the assets comprises hardware status data and/or software status data;
determining, based on the status data, a health and availability of each asset to assist each of a plurality of functions for handling disruptive events in the microgrid;
determining a resiliency index of the microgrid in performing the plurality of functions, the resiliency index being determined based on the health and availability of each asset concerning all the functions for handling disruptive events;
providing the resiliency index to a control system of the microgrid;
comparing, in the control system, the resiliency index with a least one threshold; and
changing the control of the microgrid if any of the thresholds is crossed.

2. The method according to claim 1, wherein determining the health and availability of each asset comprises determining a capacity of each asset to assist each of the plurality of functions for handling disruptive events in the microgrid.

3. The method according to claim 1, wherein the functions that handle disruptive events comprise at least one of a power balance function, a voltage control function, a frequency control function or a black start function.

4. The method according to claim 1, wherein the determined resiliency index comprises a resiliency value for each of the plurality of functions for handling disruptive events.

5. The method according to claim 1, further comprising obtaining a relevance of each asset to each of the functions for handling disruptive events, wherein the resilience is determined also based on the relevance.

6. The method according to claim 5, wherein the microgrid is connected to an external grid via a circuit breaker and wherein obtaining the status data comprises obtaining status data of the circuit breaker, the method further comprising adjusting a relevance of at least one of the assets based on the status of the circuit breaker.

7. The method according to claim 1, wherein the resiliency index is compared with a number of thresholds, one for each function for handling disruptive events, the method further comprising selecting an asset to assist such a function for which the threshold has been crossed.

8. The method according to claim 1, wherein the control system is a remote control system.

9. The method according to claim 1, wherein the microgrid has an overall control functionality, wherein obtaining the status data comprises also obtaining status data about the overall control functionality, and wherein determining the health and availability of each asset to assist each of the plurality of functions for handling disruptive events is also based on the status data of the overall control functionality.

10. The method according to claim 1, further comprising providing the resiliency index to an energy management system.

11. An arrangement for determining resiliency in a microgrid comprising a number of assets, where each asset is a different type of electric energy subsystem in the microgrid, wherein the arrangement comprises at least one control unit configured to:
obtain status data about devices used to control the assets as well as about communication resources of this control, where the status data about the devices used to control the assets comprises hardware status data and/or software status data;
determine, based on the status data, a health and availability of each asset to assist each of a plurality of functions for handling disruptive events in the microgrid;

determine a resiliency index of the microgrid in performing the plurality of functions, the resiliency index being determined based on the health and availability of each asset concerning all the functions for handling disruptive events; and compare the resiliency index with at least one threshold and change the control of the microgrid if any of the thresholds is crossed.

12. The arrangement according to claim 11, wherein the at least one control unit comprises at least one commitment determining module arranged to obtain the status data, at least one resiliency determining module arranged to determine a resiliency index and a resilience investigating module arranged to compare the resiliency index with at least one threshold and change the control of the microgrid if any of the thresholds is crossed.

13. The arrangement according to claim 12, further comprising a number of local control units and a central control unit, wherein every commitment determining module is provided in a corresponding local control unit, the resilience investigating module is provided in the central control unit and the resilience determining module is provided in a local control unit or the central control unit.

14. A computer program product for determining resiliency in a microgrid comprising a number of assets, where each asset is a different type of electric energy subsystem in the microgrid, the computer program product comprising a non-transitory memory with computer program code stored therein, the computer program code configured to executed by at least one control unit, when the computer program code comprises:

at least one commitment determining module arranged to obtain status data about devices used to control the assets as well as about communication resources of this control and determine, based on the status data, a health and availability of each asset to assist each of a plurality of functions for handling disruptive events in the microgrid, where the status data about the devices used to control the assets comprises hardware status data and/or software status data;

at least one resiliency determining module arranged to determine a resiliency index of the microgrid in performing the plurality of functions, the resiliency index being determined based on the health and availability of each asset concerning all the functions for handling disruptive events; and a resilience investigating module arranged to compare the resiliency index with a least one threshold and change the control of the microgrid if any of the thresholds is crossed.

15. The arrangement according to claim 11, wherein determining the health and availability of each asset comprises determining a capacity of each asset to assist each of the plurality of functions for handling disruptive events in the microgrid.

16. The arrangement according to claim 11, wherein the determined resiliency index comprises a resiliency value for each of the plurality of functions for handling disruptive events.

17. The arrangement according to claim 11, wherein the microgrid is connected to an external grid via a circuit breaker, wherein obtaining the status data comprises obtaining status data of the circuit breaker, and wherein the at least one control unit is configured to adjust a relevance of at least one of the assets based on the status of the circuit breaker.

18. The computer program product of claim 14, wherein the functions that handle disruptive events comprise at least one of a power balance function, a voltage control function, a frequency control function or a black start function.

19. The computer program product of claim 14, wherein the microgrid has an overall control functionality, wherein obtaining the status data comprises also obtaining status data about the overall control functionality, and wherein determining the health and availability of each asset to assist each of the plurality of functions for handling disruptive events is also based on the status data of the overall control functionality.

20. The computer program product of claim 14, wherein the at least one control unit comprises at least one commitment determining module arranged to obtain the status data, at least one resiliency determining module arranged to determine a resiliency index and a resilience investigating module arranged to compare the resiliency index with at least one threshold and change the control of the microgrid if any of the thresholds is crossed.

* * * * *